June 10, 1947.    F. H. C. DORNER    2,422,084
FISHING ROD HANDLE
Filed Aug. 4, 1945

F. H. C. Dorner
Inventor
by
T. Harold Fickes
Attorney

Patented June 10, 1947

2,422,084

UNITED STATES PATENT OFFICE 2,422,084

FISHING ROD HANDLE

Frank H. C. Dorner, Galt, Ontario, Canada, assignor to Whitehall Machine and Tools Limited, Galt, Ontario, Canada, a corporation of Ontario Application August 4, 1945, Serial No. 608,886

6 Claims. (Cl. 43—22)

This invention relates to a fishing rod handle and is particularly directed to providing an improved and novel arrangement for detachably mounting a reel thereon.

A fishing rod handle comprises, in general, a hand grip portion at one end, a tubular rod receiving portion at the opposite end, and a reel seat portion intermediate of the two ends. Releasable means are provided in the reel seat receiving portion to lock the base of the reel firmly in its seat.

A primary object of this invention is to provide an improved and novel arrangement of parts for releasably mounting the reel in the reel seat receiving portion of the handle whereby the reel is held firmly in fixed position regardless of the pulling strains to which it is subjected.

A further object of the invention is to provide a novel arrangement of parts for locking the reel in its seat whereby, as strains tending to release the reel from its seat are increased, they are opposed by an opposite pressure which grips and clamps the reel in its seat and any possibility of the reel becoming released from its seat during use is avoided regardless of the pulling strains to which it is subjected.

The fishing rod handle of the present invention comprises, in general, a hand grip portion, a rod receiving portion, and a reel receiving portion having a surface adapted to receive a reel base between the hand grip and rod receiving portions, a pivotally mounted forwardly extending clamping member at the rearward end of the reel receiving portion extending above the surface thereof and having a trigger-like extension, and spring urged means mounted in the hand grip portion normally urging said clamping member in a forward direction.

An understanding of the manner in which the above and other objects of the invention are attained may be had from the following description, reference being made to the accompanying drawing in which.

Like reference characters refer to like parts throughout the specification and drawings.

Figure 1:
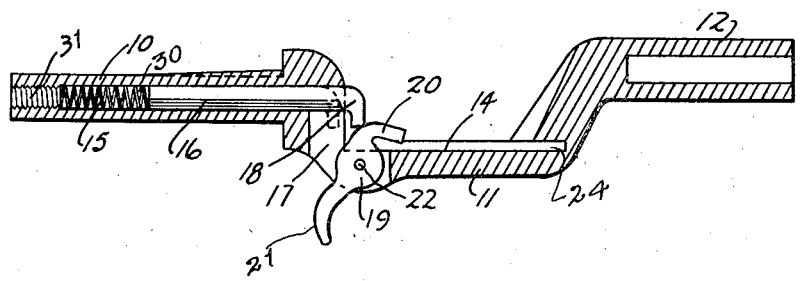
Figure 1 is a cross sectional side elevation of a fishing rod handle incorporating the present invention.
Figure 2:
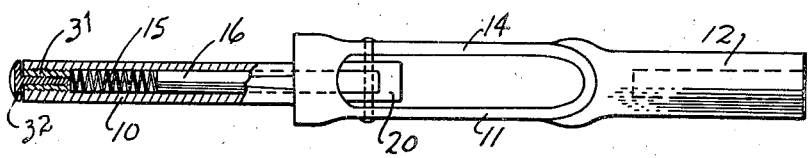
Figure 2 is a top plan view partly in section.
Figure 4:
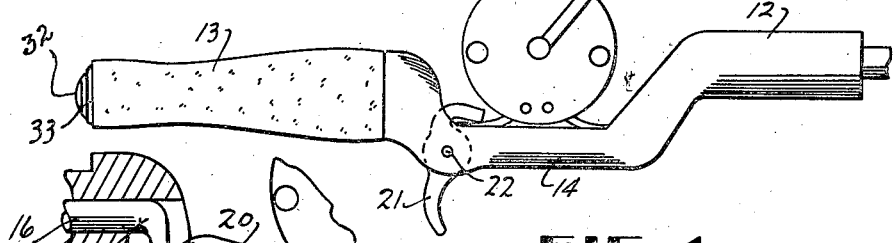
Figure 4 is a sectional side elevation of the handle with the reel locked in place.
Figure 3:
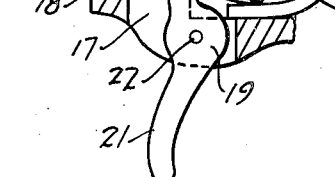
Figure 3 is an enlarged detail view of the locking assembly.

Referring to Figures 1-4 of the drawings, the fishing rod handle comprises a hand grip portion 10, a reel receiving portion 11, and a rod receiving portion 12. The handle is preferably formed of light strong metal, such as aluminum or an aluminum alloy, and the handle grip portion is preferably encased in cork, as indicated by the numeral 13, or like material to provide a secure hand grip. The reel seat portion is preferably depressed and provides an elongated plane surface 14 on which the reel base rests. The forward end wall of the reel seat portion is preferably undercut, as indicated by the numeral 24, to form a recess adapted to receive the forward end of the reel base in sliding fit engagement.

The rod receiving portion 12 is of standard design and is adapted to receive the butt end of a fishing rod.

The hand grip portion 10 is centrally bored, as indicated by numeral 30, to receive a spring 15 and a plunger 16. The bore 30 communicates with a recess or passageway 17 formed in the rearward end of the reel receiving portion and the forward end of the plunger 16 extends into the recess 17. The end of plunger 16 is preferably formed with a projection 18 which extends downwardly into recess 17.

A latch member 19 is pivotally secured, by a pin 22, to the rearward end of the depressed reel receiving portion. The upper end of the latch member is formed with a forwardly extending clamping member 20 which is spaced slightly above the plane surface 14. The lower end of the latch member extends downwardly below the handle as a trigger-like extension 21. The extension 21 is preferably curved to provide a secure finger grip.

In the assembly of the device, the rearward part of the clamping member 20 is positioned in the recess 17 in such a manner that the forward end of the plunger 16 is normally pressed firmly against its rearward edge by spring 15 to urge the clamping member 20 into a forwardly extending position.

The arrangement of the spring 15 and plunger 16 in the handle 10 may be of any one or combination of two or more assemblies. In the preferred illustrated embodiment, the rear wall of the reel receiving portion is partially cut away to form the recess 17 which communicates with the bore 30 and the spring and plunger parts may be inserted into the central bore through that cut-away portion prior to mounting the latch member 19 in place. The rearward end of the spring 15 is pressed against a hollow stop member 31 threaded into the rearward end of the handle and the forward end is urged against the rearward end of the plunger.

In accordance with standard practice, the frame of the hand grip portion is covered with a light gripping material 13, such as cork or other material having similar properties. This material is fitted on the handle and secured in place by a washer 33 which, in turn, is fixed in place by a set screw 32 threaded into the hollow stop member 31.

The fishing rod handle illustrated in Figures 1-4 has a number of important advantages over the devices of the prior art. It is light, strong, and easily and inexpensively manufactured. The spring urged plunger normally urges the clamping member 20 into a forwardly extending position, in which position it overlies the rearward extension of the reel base to clamp the base firmly in fixed position. In use, a finger of the user grips the trigger-like extension 21 and tends to draw it rearwardly thereby increasing the clamping effect of the latch-like member 20 whereby the reel is held firmly fixed in its seat regardless of the pulling strains to which it is subjected.

Figure 5:
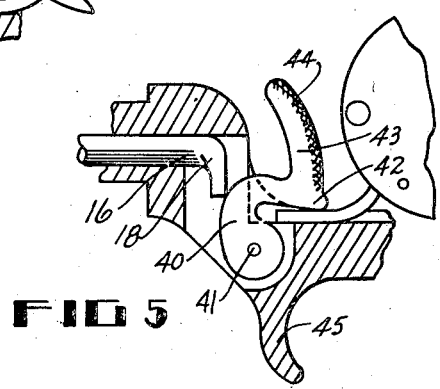
Figure 5 is an enlarged detail view of an alternative arrangement of the clamping member and trigger-like extension.

In the modification of the invention illustrated in Figure 5, the latch 40 is pivotally secured to the rearward end of the reel receiving portion by the pin 41. The upper end of the latch is provided with a forwardly extending clamping member 42 and an upwardly extending projection 43 adapted to be engaged by a thumb or finger of the user. The uppermost surface of the projection 43 may be corrugated to provide a gripping surface. In this construction, the clamping member 42 is urged into its clamping, forwardly extending position by the spring urged plunger member 16 in the manner described hereinbefore. It is retracted from its forwardly extending position to release the reel by rearward pressure on the projection 43. In this embodiment, a downwardly extending, trigger-like piece 45 may be fixedly secured at the rearward end of the reel receiving portion.

The reel is readily attached to the handle by retracting the clamping member 20 or 42, sliding the forward end of the reel base into the recess 24, resting the base on the plane surface 14 and then releasing the member 20 or 42 which is immediately urged, by the plunger 16 into its clamping position to lock the base securely in its seat. In disassembling the fishing rod, the reel is readily released by retracting the locking member 20 or 42 and sliding the forward end of the base out of the pocket 24.

It will be understood, of course, that modifications may be made in the preferred embodiment of the invention described and illustrated herein without departing from the scope of the invention as defined by the appended claims.

What I claim as new and desire to protect by Letters Patent of the United States is:

1. A fishing rod handle comprising a hand grip portion, a rod receiving portion and a reel receiving portion having a surface adapted to receive a reel base between the hand grip and rod receiving portions, a member pivotally attached to the rear end of the reel receiving portion and having extensions one of which forms a clamping member and the other a finger grip member, and spring urged means mounted in the hand grip portion normally urging said clamping member in a forwardly extending position.

2. A fishing rod handle comprising a hand grip portion, a rod receiving portion, and a reel receiving portion having a surface adapted to receive a reel base between the hand grip and rod receiving portions, a pivotally mounted forwardly extending clamping member at the rearward end of the reel receiving portion extending above the surface thereof and having a trigger-like piece extending downwardly below said portion, and spring urged means mounted in the hand grip portion normally urging said clamping member in a forwardly extending position.

3. A fishing rod handle comprising a hand grip portion, a rod receiving portion, and a reel receiving portion having a surface adapted to receive a reel base between the hand grip and rod receiving portions, a pivotally mounted forwardly extending clamping member at the rearward end of the reel receiving portion extending above the surface thereof and having a trigger-like piece extending downwardly below said portion, and spring urged means mounted in the hand grip portion normally urging said clamping member in a forwardly and downwardly extending position.

4. A fishing rod handle comprising a hand grip portion, a rod receiving portion and a depressed reel receiving portion having a surface adapted to receive a reel base between the hand grip and rod receiving portions, a pivotally mounted forwardly extending clamping member at the rearward end of the reel receiving portion extending above the surface thereof and having a trigger-like piece extending downwardly below said portion, and spring urged means mounted in the hand grip portion normally urging said clamping member in a forwardly extending position.

5. A fishing rod handle comprising a hand grip portion, a rod receiving portion, and a reel receiving portion between the hand grip and rod receiving portions, means for securing the forward end of a reel base in the forward end of said reel receiving portion and means for securing the rearward end of the reel base comprising a pivotally mounted, forwardly extending clamping member at the rearward end of the reel receiving portion extending above the surface thereof and having a trigger-like piece extending downwardly below said portion, and spring urged means mounted in the hand grip portion normally urging said clamping member in a forwardly extending position.

6. A fishing rod handle comprising a hand grip portion, a rod receiving portion, and a reel receiving portion having a surface adapted to receive a reel base between the hand grip and rod receiving portions, a pivotally mounted forwardly extending clamping member at the rearward end of the reel receiving portion extending above the surface thereof and having a trigger-like piece extending downwardly below said portion, and spring urged plunger means mounted in the hand grip portion, the forward end of said plunger normally engaging the rearward edge of said clamping member to urge said clamping member in a forwardly extending position.

F. H. C. DORNER.

REFERENCES CITED

The following references are of record in the file of this patent:

UNITED STATES PATENTS

| Number | Name | Date |
| --- | --- | --- |
| 2,289,216 | Seidel | July 7, 1942 |
| 2,102,237 | Kinnear | Dec. 14, 1937 |